United States Patent [19]

Takada et al.

[11] 4,006,965
[45] Feb. 8, 1977

[54] PROJECTION SCREEN

[76] Inventors: Ryosaku Takada, 5-54, 4 -chome, Ayazono, Takaishi, Osaka; Akemi Joma, 25-21, 3-chome, Shindo, Ibaraki, Osaka, both of Japan

[22] Filed: Dec. 23, 1974

[21] Appl. No.: 535,306

[30] Foreign Application Priority Data

Apr. 18, 1974 Japan .................. 49-44540[U]
May 8, 1974 Japan ..................... 49-51532

[52] U.S. Cl. .............. 350/117; 350/127; 350/129; 428/285
[51] Int. Cl.² .................................... G03B 21/60
[58] Field of Search .......... 350/117, 127, 128, 129, 350/288; 139/420 C; 428/285

[56] References Cited
UNITED STATES PATENTS

| 232,122 | 9/1880 | Hammesfahr | 350/117 X |
| 1,810,169 | 6/1931 | Gray | 350/117 X |
| 1,926,732 | 9/1933 | North | 350/129 |
| 2,210,806 | 8/1940 | Etbauer | 350/117 |
| 3,507,548 | 4/1970 | Hoffman | 350/117 |
| 3,653,740 | 4/1972 | Ogura et al. | 350/117 |
| 3,844,644 | 10/1974 | Martinez | 350/117 |

FOREIGN PATENTS OR APPLICATIONS

| 227,504 | 10/1959 | Australia | 350/117 |
| 1,131,909 | 2/1962 | Germany | 350/129 |
| 191,640 | 9/1923 | United Kingdom | 350/127 |

*Primary Examiner*—Edna M. O'Connor

[57] ABSTRACT

A screen comprises a fabric formed by weaving transparent fiber bundle thereinto and a metallic layer formed on the whole surface of one side of said fabric and having an optically high reflectability.

4 Claims, 7 Drawing Figures

PROJECTION SCREEN

The present invention relates to a screen.

As the prior arts, known are a sheet-like fabric of cotton or synthetic fiber and a sheet of synthetic resin such as polyvinyl chloride the reflection surface of which may be coated with white pigment, metal powder e.g. alminium powder or glass beads having a variety of particle diameters for the purpose of improving the optical property thereof.

Among them, a screen most conventionally used in a movie house, a theater or others is of a kind called white screen or silver screen.

These screens of the prior art, however, are not satisfactory in optical, mechanical or fire-proof property or durability thereof as described below.

The main optical properties required by an excellent reflection surface of a screen are a high optical reflectability, a high diffuse reflectability, and a prism effect of the reflection surface being small enough to be visually negligible.

"Reflectability" of the reflection surface of a screen is an optical quality expressed as the ratio of the light flux projected onto the reflection surface of a screen to that reflected by said reflection surface, or quantatively, as the reflection factor (%).

If the reflection surface of a screen has a low reflectability, the brightness of the image on said reflection surface is reduced, and therefore large amount of electric power is required for providing highly bright and clear images. In order to obtain an effective projection and clear images on a screen, the reflection factor of the reflection surface of a screen is preferably as large as possible.

On the other hand, the reflection of light flux occurs on the basis of different two optical mechanisms.

One of them is a regular reflection or specular reflection mechanism wherein projecting light flux is reflected in the direction of a specified reflection angle corresponding to the incidence angle, and the other is a diffuse reflection mechanism wherein parallel projection light flux is reflected in all directions.

In order to provide clear images uniformly to all the theater audience in all directions, the proportion of all reflection light flux in diffuse reflection light flux is preferably as large as possible.

The "diffuse reflection property" of a screen is quantatively indicated by measuring the amount of the light flux reflected by the screen in all directions of the space for the audience, or measuring the angular distribution of the reflected light flux.

Prism effect is such an optical phenomenon that diffuse of color spectrum occurs because reflection factor, deflection factor, absorption factor and transmission factor vary in correspondence with wave length of the light.

When the prism effect of a screen is so large as not to be negligible for audience, images on the reflection surface of a screen have blurred, double, shearing and thus unclear color visions or the like.

Screens of the prior art, for example, the abovementioned white screen, silver screen or glass beads screen and others do not satisfactorily meet with the abovementioned optical properties required for an ideal screen.

For example, a white screen or a screen comprising polyvinyl chloride sheet the surface of which is coated with a paint including a white pigment has an insufficient reflectability, while a screen comprising a polyvinyl chloride sheet having the reflection surface coated with aluminum powder is unexcellent in diffuse-reflectability so that the audience seated on the sides in a theater receives a less amount of light than those seated in the center therein.

A glass bead screen comprising a polyvinyl chloride sheet the reflection surface of which is coated with glass beads having a variety of particle diameters respectively shows a remarkably strong prism effect so that even a rainbow is formed on the reflection surface of the screen during projecting.

Owing to this critical disadvantage, a glass bead screen is rarely used in movie houses and theaters.

The installations of movie houses and theaters have been remarkably improved and nowadays there are a number of large movie houses and theaters having a large seating capacity.

Further, movie picture art has also remarkably improved thus affording to provide beautiful images and clear and detailed pictures.

Such improvement in relative arts also increases earnest desire for a screen having a more excellent optical property.

Another important property of an advantageous screen is a high mechanical strength and nonelasticity. A highly elastic screen e.g. comprising a sythetic resin sheet has a disadvantage of easily becoming wrinkled and loosened in part, and distorted in the reflection surface thereof.

High mechanical strength and nonelasticity are indispensable properties especially for a wide screen. A wide screen is stretched usually on a moderately curved surface and has an extremely large area, so that it is necessary for the whole reflection surface of the screen to form a uniformly moderately curved surface.

Another important property of a screen is durability against weathering. The optical properties and the mechanical strength of a screen decay or decrease with the lapse of time.

According to the data obtained from the inventor's long-time measurement, it has been proved that the optical property of a screen of prior art, e.g. reflectability decreases nearly by 10 - 30% in a year of use.

The decay of the optical property of a screen is caused by chemical change of the material thereof, digeneration of the material due to moisture and oxygen in the atmosphere and further the light, stain of the reflection surface of the screen with dust or the like.

Another and more important property of a screen is fire-resistance or incombustibility and the property of not fuming in heating.

However, most of the conventional screens are formed of inflammable synthetic resin e.g. polyvinyl chloride and therefore generally do not have fire-resistance or incombustibility, and further is apt to emit poisonous gas.

According to the present invention, the abovementioned difficulties in the prior art can be eliminated by providing a screen comprising a fabric formed of transparent fiber bundle and a metal layer of optically high reflectability connected to one side of said fabric.

Therefore, an object of the present invention is to provide a new screen having a remarkably improved optical property.

Another object of the present invention is to provide a screen remarkably excellent in mechanical strength and nonelasticity.

A further object of the present invention is to provide a screen having high durability in optical and mechanical properties.

A further object of the present invention is to provide a screen having incombustibility or flame proof property and not emitting poisonous gas.

These and other objects of the present invention will become more apparent from the following description of the present invention.

DETAILED DESCRIPTION OF THE INVENTION

A screen according to the present invention comprises a fabric (cloth) formed of transparent fiber bundles and a metal layer connecting to the whole surface of the one side of said fabric by coating by vaporization, by adhering or by weaving or knitting into a double formation.

The transparent fabrics to be used for producing a screen according to the present invention are a variety of kinds of fibers which have high light transmittance and are capable of being woven into a fabric or cloth.

The preferred fabric materials according to the present invention are, glass fiber, metyl methaclyrate (organic glass), and a variety of resins having high light transmittance such as oriented polypropylene, polycarbonate, polystyrene, polyester, polyamide, polyethylene, aclyric resin, polyvinylidene chloride, polyvinylidene cyanide, polyfluoroethylene, copolymer of polyvinyl alcohol and polyvinyl chloride, and the like.

According to the inventor's opinion, glass fiber has been proved to be the most suitable fiber material for a screen of the present invention because of not only its excellent optical property such as high transparency but high mechanical strength, nonelasticity and fire-resistance.

Metacrylic acid ester resin (organic glass) is known as a material having excellent transparency and one of the preferable fiber materials of a screen according to the present invention.

Many other synthetic fiber materials as abovementioned can also form a screen having excellent optical properties according to the present invention.

The structure of a fabric (cloth) comprising transparent fiber bundles according to the present invention is selected depending on the qualities such as optical property, mechanical strength and the like. In other words, the structure of the fabric (cloth) has to be dense enough at least not to directly transmit the light therethrough, but too thick a fabric (cloth) is not preferable since it results in increase of loss of the light by absorption. Normally, a fabric (cloth) comprising yarns the mean diameter of which is about 0.01 mm – 1.0 mm is preferable.

Further, a dense and rigid fabric (cloth) is more preferable than one having a slack structure, since a screen set up for use has not to be loosened and therefore is preferably nonelastic.

The structure of a fabric (cloth) is determined not only by the thickness of the yarn but also by the manner to weave the yarn. According to the present invention, plane weave, satin weave and twill weave which are three basic weaves and their modifications, namely, imitation weave, brocade weave and double weaves can be applied. Generally, satin weave is preferable because it can provide a fabric (cloth) with a dense structure.

However, the property required for the structure of the fabric (cloth) is only a density enough to prevent the direct transmission of the light therethrough, the structure of the fabric is suitably selected depending on the thickness of the yarn, the number of fibers forming the yarn, the kind of the yarn, for example, it being a double yarn or a double and twisted yarn or the like.

Structures of fabrics (clothes) will be now described with respect to each fabric material in the following.

GLASS FABRICS

A single yarn of glass fiber is called filament, the mean diameter of which is normally 3 – 13 $\mu$.

As typical glass fibers, known are glass cloth and roving cloth, which are suitable for a screen according to the present invention.

Glass cloth is obtained by plain weaving, satin weaving and twill weaving which are three basic weavings and their modifications, namely, imitation, brocade and double weavings. And known are a variety of kinds of glass yarns such as single filament, double yarn, double and twisted yarn and the like, which can be all used as yarn forming glass cloth for a screen according to the present invention.

An example of a preferred yarn is formed by twisting 100 – 200 pieces of glass filaments. Roving cloth is formed by weaving rovings each of which is a yarn of 1 – 20 pieces of double yarn into a fabric.

An example of a preferred double yarn of roving is a yarn of 100 – 200 pieces of glass filaments each having 5 – 10 $\mu$ diameter.

Glass fabrics according to the present invention is formed by weaving glass yarn as abovementioned in the manner known per se.

FABRICS OF SYNTHETIC FIBER

Such a transparent synthetic yarn as abovementioned is woven into a fabric having the structure of one of three basic weavings or their modifications. Normally, preferable is a fabric formed by weaving yarns having the mean diameter of about 0.01 mm – 1.0 mm into a fabric with the mean density of about 40 – 150 pieces/25 mm. Therefore, it will be appreciated that most of fabrics of synthetic yarn are included in the scope of the present invention. However, they must be fabrics which have not dyed or coated with pigment yet, of course. It is because such dyes and pigments generally destroy transparency of the fibers.

A screen according to the present invention is manufactured by connecting an optically high reflectable metal layer to the whole surface of one side of a fabric comprising transparent yarns by means of coating by vaporization e.g. coating by vacuum vaporization, spattering or the like, or by means of adhering with an optically transparent adhesive. Another important modified method for forming the metal layer is to integrally manufacturing a two-layered fabric by specified double weaving using two kinds of yarns, namely, transparent yarn and yarn coated with metal e.g. aluminum by vaporization, the latter being so-called silver yarn, one side of said double fabric comprising only said transparent yarn and the other side comprising only said yarn coated with metal by vaporization.

Methods for connecting a metal layer to one side of a fabric of transparent fiber will be described below.

METAL COATING BY VAPORIZATION

Coating by vaporization e.g. coating by vacuum-vaporization, spattering or the like is known as a method for forming a thin layer of metal or alloy on glass material or plastic film.

Metals suitable for a metal layer to be coated are aluminum, tin, silver, lead or their mixture, each capable of forming an optically high reflective metal layer to be coated, among which the most preferable is aluminum in the respects of reflectability, cost, chemical stability and the like. Normally, the thickness of the coated metal layer is preferably 0.01 mm – 0.10 mm for the purpose of providing sufficient mechanical strength.

METALLIC FOIL ADHERING METHOD

Metallic foils suitable for this method are aluminum foil, tin foil, plastic film coated with aluminum by vaporization and the like.

Adhesives to be used in this method are ones based on resin which does not destroy the optical property of a screen, thus being capable of forming light transmittable film, and adhesives for adhension of metal and glass or metal and plastics can be used.

Typical adhesives according to the present invention are epoxy resin adhesive, phenol resin adhesive, phenolic epoxy adhesive, nylon epoxy adhesive, fluorine plastic adhesive and the like, and such an adhesive is selected according to the character of fabric material (e.g. glass or plastics).

DOUBLE WEAVING METHOD

Figure 3:
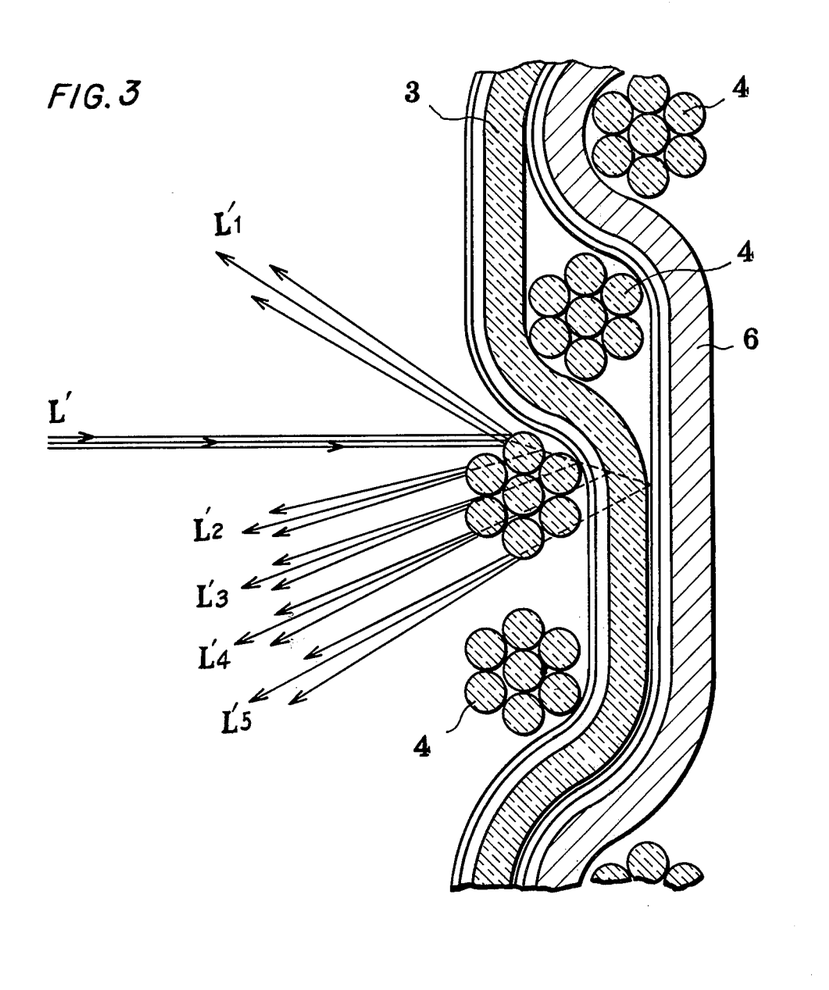
FIG. 3 is a modified embodiment of a screen according to the present invention.

Another important embodiment of a screen having two layers, namely, a transparent fiber fabric layer and a metal layer, according to the present invention is a fabric having a first layer comprising only transparent yarn and a second layer comprising only yarn coated with metal by vaporization, said fabric being integrally formed by double-weaving transparent yarn and metal coated yarn (so-called silver yarn). The fabric layer (the second layer) comprising metal coated yarn has to be provided with such a density as to prevent the light transmission in order to function as a reflection surface. And this requirement is the same with that of the said transparent fiber fabric. Therefore, the thickness of the metal coated yarn and the structure of the said second layer are similar to the thickness of the transparent yarn and the structure of the fabric formed thereof respectively. One example of the structure of a screen of this embodiment is shown in FIG. 3.

A screen having such a structure is advantageous not only because of easy manufacturing and rigidness and unreleasability resulting from the integrally woven two layer connection, but because the belowmentioned specific optical property resulting from the fabric structure of the metal layer of its own.

If increase of mechanical strength of a screen manufactured as abovementioned is desired, a plastic film, a sheet, a cloth or the like may be superposed on the outer surface of the metal layer.

In order to reinforce the connection between a metal layer (layer coated with metal by vaporization, or a metallic foil) and a fabric, a screen may be subject to impregnation with an appropriate transparent impregnating resln e.g. PVA resin or the like.

Further, in order to prevent the contamination of the reflection surface of a screen by attachment of dust thereon, said surface may be coated with silicone resin or the like.

Other modifications are included in the present invention so long as they are within the spirit of the present invention.

The surprising advantages of the present invention will become more apparent from the description of optical effects of a screen with reference to the appended drawings, in which.

Figure 1:
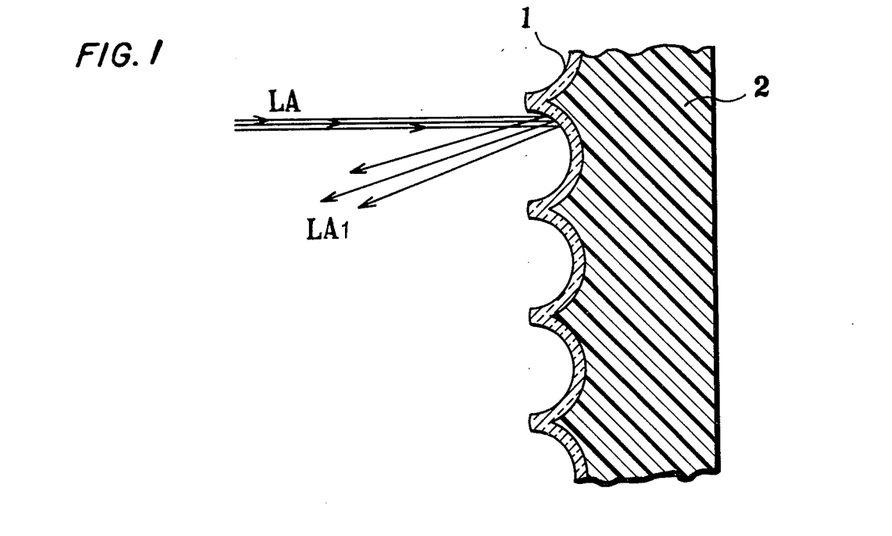
FIG. 1 is an enlarged diagrammatical section of a screen of the prior art, or a white screen most conventionally used today.

Referring to FIG. 1, shown are a reflectable coating layer 1 and a plastic sheet layer 2 of e.g. polyvinyl chloride.

The reflection surface of the plastic sheet layer 2 is embossed and further coated with a reflectable paint (e.g. paint including white pigment).

When a parallel light flux $L_A$ is projected on the screen, a part of projected light flux is absorbed into the coated layer 1, while most of the other part of the light flux is reflected in the direction $L_{A1}$.

In this case, the diffuse reflection depends upon the embossment on the reflection surface, so that in order to obtain the reflected light flux $L_{A1}$ uniformly diffused in a wider directions, a more minute embossment has to be formed on the reflection surface of the screen. However, since it is extremely difficult to emboss a minute and uniform geometric pattern on the surface of the plastic sheet, the diffuse reflection property of such a screen is necessarily limited to a given extent, which fact will be confirmed by the data of optical property of screens provided by the inventor and mentioned below.

In addition, the surface of the screen shown in FIG. 1 or a white screen is coated with a paint including white pigment, but the reflection factor of this coating layer is not sufficient, thus resulting in the loss of the light flux due to absorption of considerable amount of the light into said coating layer.

Figure 2:
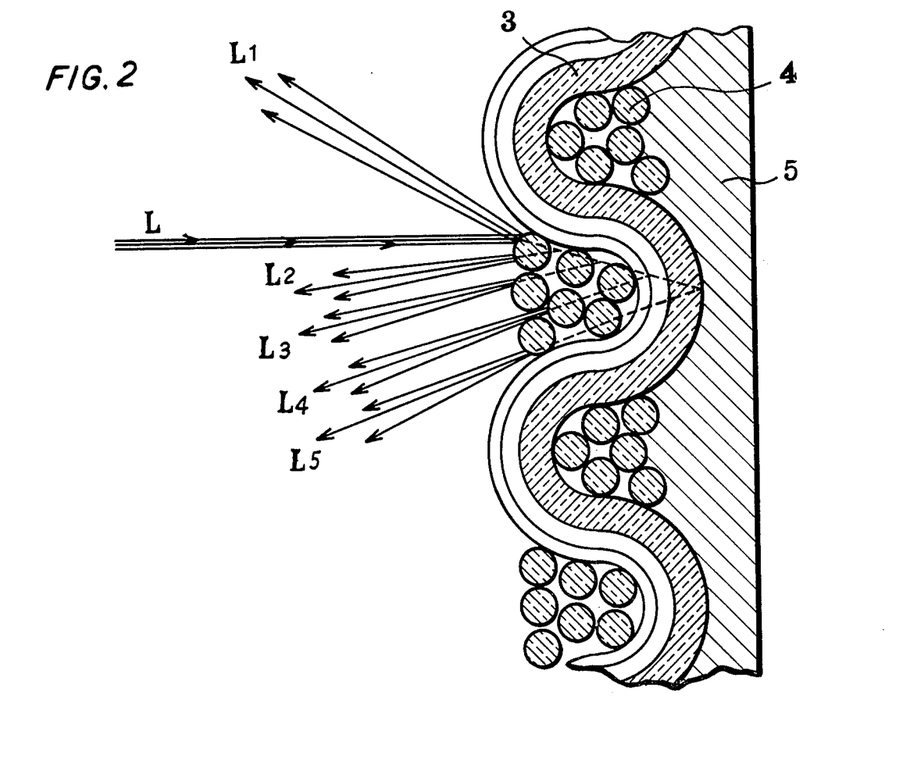
FIG. 2 is an enlarged diagrammatical section of a screen according to the present invention.

Referring now to FIG. 2, shown are transparent fiber such as glass fiber or fiber bundle (yarn, strand, roving or the like) 3, 4 and a high reflectable metal layer such as aluminum layer vaporization-coated on or adhered to the whole surface of one side of the fabric.

When the projecting light L is projected onto the reflection surface of the screen, a part of the incident light flux is reflected by the surface of the fabric having extremely irregular and minute embossment thereon in the direction $L_1$, while the other part of the incident light flux refractedly and reflectedly permeates the fabric layer comprising transparent fiber or yarn, reaching the metal layer 5, being reflected by the reflection surface of said layer 5, and being reflected through complicated and irregular light path and finally being branched in the irregular directions such as $L_2$, $L_3$, $L_4$, $L_5$ and the like.

In the abovementioned optical process, it may be, of course, possible that a part of the light flux having penetrated into the fabric layer goes out of the screen surface before it reaches the reflection surface of the metal layer.

Referring now to FIG. 3, another important example of a screen is shown in which numeral 6 indicate fiber bundles which are vaporization-coated with metal.

The optical feature of this screen is that since the metallic reflection surface per se has a fabric structure, the reflection of the light thereon are made more irregular thus providing a more excellent diffuse reflection factor.

For example, a parallel incident light flux L' is reflected in extremely various directions $L_1'$, $L_2'$, $L_3'$ . . . through the optical functions of two layers, namely, the fabric layer comprising transparent yarns and the reflection layer having the fabric structure.

Thus, the diffuse reflection property of the light flux of a screen according to the present invention results not only from the minute and irregular form of the fabric surface but from the diffused reflection based on the combination of the fabric layer comprising transparent fiber or fiber yarn which is an optical medium having extremely irregular structure and the metallic reflection surface having extremely high reflectability.

It is a basic advantage of the present invention that though a screen according to the present invention makes use of a fabric layer which is an optically complicated medium, a high reflectability can be maintained through the function of the metallic reflection surface almost without losing the light amount by absorption.

A high diffuse reflection property and a high total reflection property are optical properties contradictory to each other and a reflection surface of a screen provided with said two properties have been first obtained by a screen according to the present invention having the abovementioned optical structure.

To sum up the optical features of a screen according to the present invention from the viewpoint of an optical device, firstly, the screen has a high reflectability or as high a reflection factor as an ordinal glass surface due to the optical property of the metal layer, secondly, an excellent diffuse reflection property is obtained by remarkable amplification of diffuse reflection degree of the light flux due to a fabric layer having a structure of complicatedly superposing and entangling a number of transparent fiber and fiber bundles, and thirdly, the surface structure of the fabric comprising transparent fiber or fiber bundles can provide a uniformly and minutely rough surface suitable for the uniform diffuse reflection of the light flux.

Another important advantage of the present invention is that a screen can be achieved without any special technical difficulties, which is provided with optical uniformity in each part of the reflection surface.

It is because transparent fiber e.g. glass fiber can be easily woven into a large fabric with a uniform thickness today, the surface of said large fabric and can be easily coated by vaporization with or adhered to a metallic layer comprising e.g. aluminum or tin, and further, a fabric with such a double structure can be also easily manufactured by double weaving.

The present invention will be described in more detail by way of the following non-limiting examples.

EXAMPLE 1

This example provides an embodiment of a screen according to the present invention which comprises a glass cloth formed of glass fiber and an aluminum layer formed by vacuum vaporization coating.

GLASS CLOTH

Glass cloth is woven by satin weave using glass yarn (manufactured by Nittobo Co. Ltd) comprising twisted 150 pieces of filaments with the mean diameter 6.4 $\mu$ as the warp and the pick (weft). This glass cloth had a thickness of 0.21 mm, a weight density 317 $g/m^2$, a fabric density of 52 pieces of warp per 25 mm with 54 pieces of pick (weft) per 25 mm and a fabric strength of 42 $kg/cm^2$ (Mullen bursting strength).

METALLIC REFLECTION LAYER a. Aluminum film was formed on the whole surface of one side of said glass cloth by vacuum vaporization coating. The mean thickness of the film was 0.05 mm.

b. Aluminum foil with 0.05 mm thickness was adhered to the whole surface of one side of said glass cloth.

EXAMPLE 2

The same glass yarn as in Example 1 was woven into a glass cloth by plain weaving. This glass cloth had the mean thickness of 0.19 mm, a weight density of 298 $g/m^2$, a fabric density of 48 pieces of warp per 25 mm with 50 pieces of pick (weft) per 25 mm and a fabric strength of 36 $kg/cm^2$. Then, aluminum foil with 0.05 mm thickness was adhered to the whole surface of one side of said cloth.

EXAMPLE 3

This example provide several embodiments of screens according to the present invention, which screens are formed by weaving synthetic fiber e.g. MMA (metylmethacrylate) resin fiber into a fabric, nylon fiber, polyester or acrylic resin and the like and then connecting aluminum or tin film on the whole surface of one side of said fabric by vaporization coating or adhering.

a. A Screen Formed of MMA Resin

A fabric was formed by satin weaving using yarn as warp comprising twisted 100 pieces of filaments each having 15 $\mu$ diameter. This fabric had the mean thickness of 0.25 mm, a weight density 185 $g/m^2$, a fabric density of 65 pieces of warp per 25 mm with 60 pieces of pick (weft) per 25 mm. Then aluminum and tin films with about 0.03 – 0.06 mm thickness were coated on said fabric respectively by vaporization.

b. A Screen Formed of Nylon Fiber

Tricot cloth was woven using yarns comprising twisted 150 filaments each having the mean diameter of 6.0 $\mu$. This cloth had a weight density of 126 $g/m^2$, a fabric density of 70 pieces of warp per 25 mm with 65 pieces of pick (weft) per 25 mm.

Then 0.03 mm thickness of alminium foil was adhered to the whole surface of one side of the cloth using epoxy resin adhesive.

c. A Screen Formed of Polyester Fiber

A cloth of 100% of polyester (under the trade name of "Silook" NO 3200, No. SPS-4-93, satin weave, by Torai Co. Ltd.) was coated with aluminum by vaporization in the same manner as in Example 1.

d. A Screen Formed of Acrylic Resin Fiber

Aluminum foil was adhered to the whole surface of one side of cloth of 100% of acryl (under the trade name of "LILYTEX" Code-NO 370-5700 by Koizumi Co. Ltd.) in the same manner as in Example 1.

e. A Screen Formed of Non-woven Spun-glass Cloth

This cloth is formed by irregularly bundling a number of glass filaments having the mean diameter of 7.5 $\mu$ and connecting them using plastic adhesive. Then aluminum foil was ahered to the whole surface of one side of the cloth in the same manner as Example 2.

EXAMPLE 4

This example provides a screen comprising polyester fiber coated with aluminum by vaporization and thus having a metallic reflection surface.

The aluminum coated polyester resin was formed by twisting 100 pieces of polyester filament each having the mean diameter of 7.0 $\mu$ into yarn and then coating the yarn with aluminum film by vaporization (silver yarn). As transparent yarn, glass fiber used in Example 1 was adopted.

Using said two kinds of yarn, a fabric with double structure as shown in FIG. 3 was formed by double weaving.

The mean fibric density of the first layer comprising only glass fiber is 61 pieces/25 mm both in warp and pick, while that of the second layer comprising only silver yarn is 63 pieces/25 mm both in warp and pick.

Both of said two layers had sufficient density, and thus this screen could be used as one according to the present invention.

EXAMPLE 5

This example provides comparison data relating to the optical properties of the screen according to the present invention as described in the abovementioned examples and a screen of prior art.

Further data relating to the durability of the screen of prior art are also represented.

On the contrary, data relating to durability of a screen according to the present invention cannot be provided at present, since such a durability test requires a long time of 3 – 4 years.

A. Comparative Experiment Relating to Optical Property

Comparative experiment was performed relating to diffuse reflection properties of screens according to the present invention and prior art. The light source used in this experiment is a xenon short arc lamp with the light intensity of 240 $lx$, and the measuring instruments were an illuminometer (Toshiba No. 5) and a brightness-meter (Asahi Kogaku Spotmeter FL type). The distance between the light source and the screen was 10 m, while the measurement was carried out in the position 5 m away from the screen with the angle range of 0° – 90°.

Figure 4:
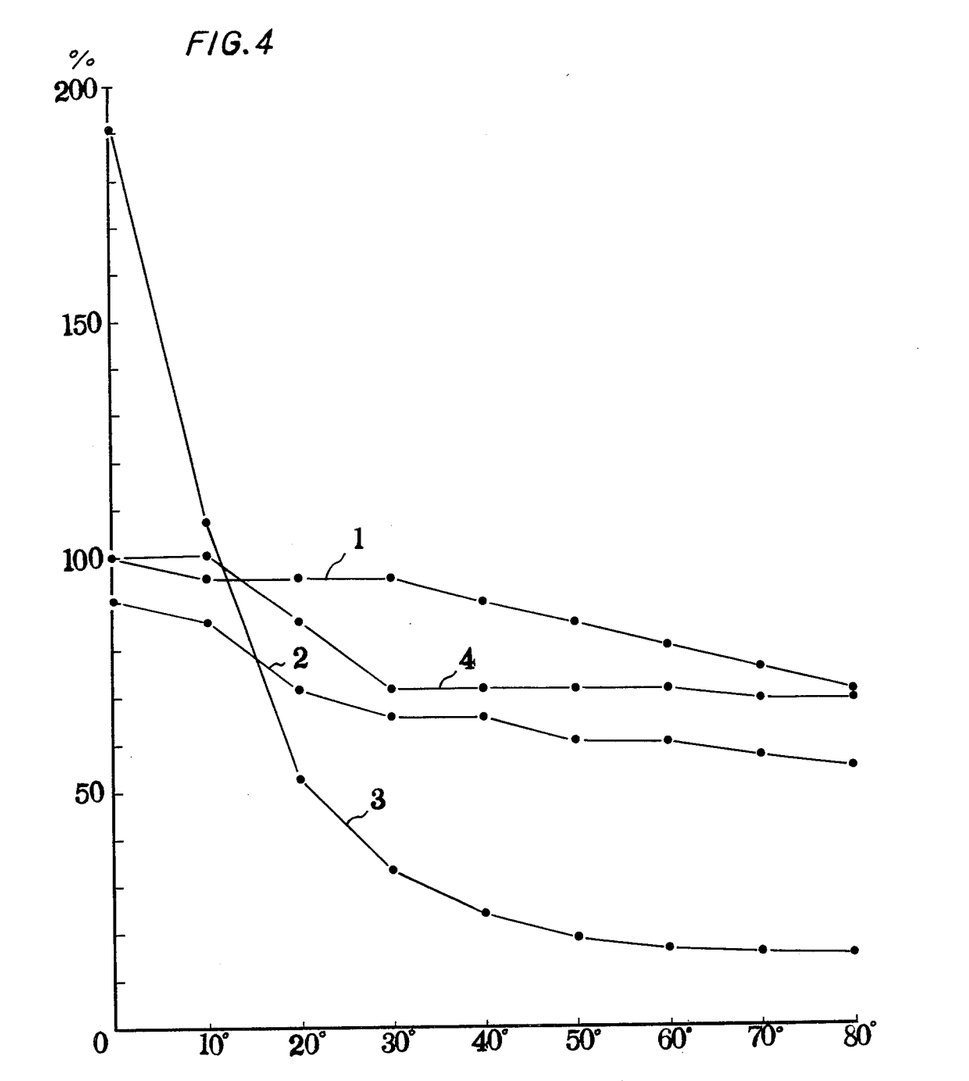
FIGS. 4 – 7 are experimental data of a screen.
Figure 5:
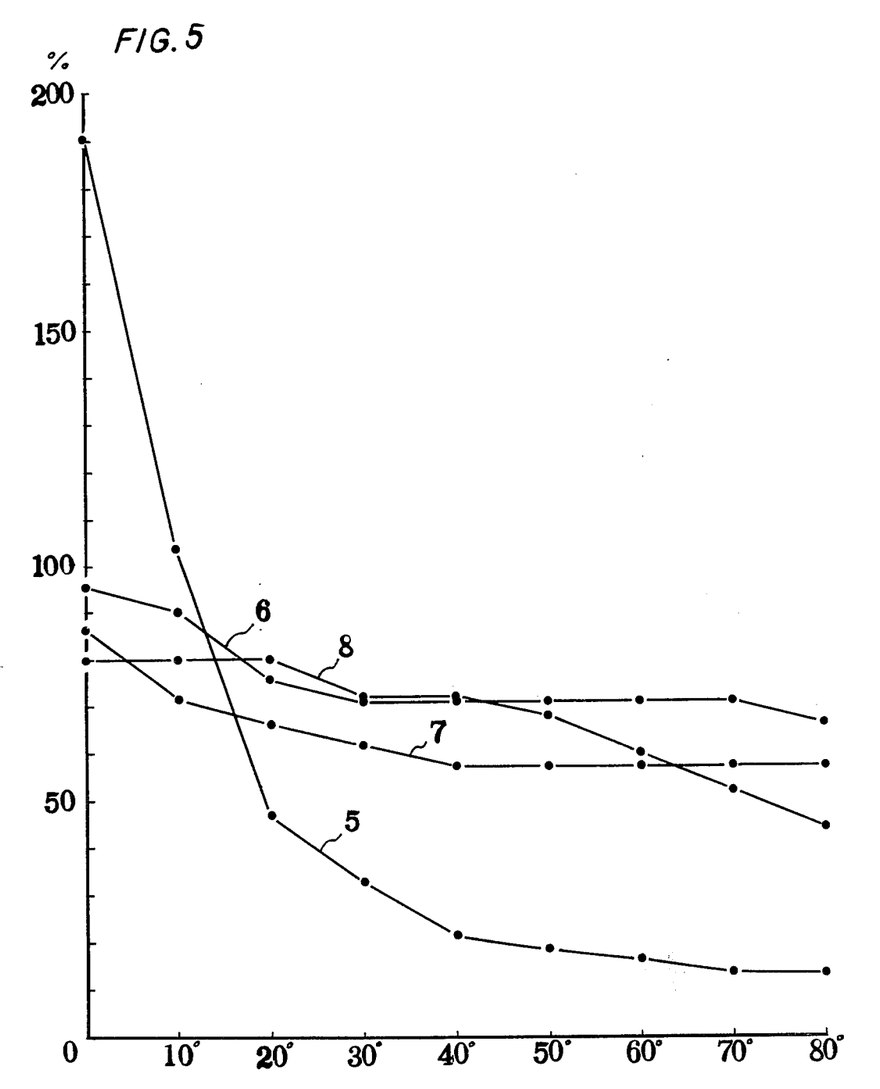
Figure 6:
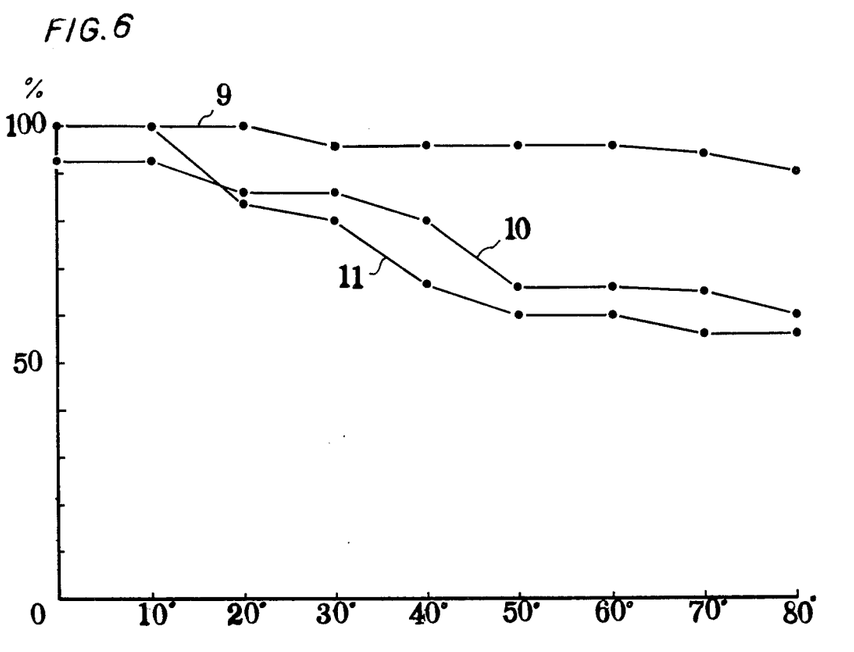

In FIGS. 4 – 6, the results of this experiment were expressed in values relative to a standard taking the brightness of 0° reflection position of magnesium oxide reflection surface as 100. Magnesium oxide reflection surface is one of the most excellent diffuse reflection surface and conventionally used as a control surface in such kinds of tests.

| TEST NO. | SCREENS |
|---|---|
| 1 | Control surface (for MgO reflection) |
| 2 | White screen |
| 3 | Silver screen (without holes) |
| 4 | Example 1 - a |
| 5 | Silver screen (with hole) |
| 6 | Example 1 - b |
| 7 | Example 2 |
| 8 | Example 3 - b |
| 9 | Example 3 - c |
| 10 | Example 3 - d |
| 11 | Example 3 - e |

It will be appreciated from the data that the reflection surfaces of the screens according to the present invention are so excellent as competing with the MgO reflection surface in diffuse reflection property.

B. Measurement of Yearly Change of Reflection Factor of a Screen of Prior Art This experiment followed yearly change of the reflectability of reflection surfaces of kinds of screens. The values are obtained depend on the measurement of the mean illumination intensity throughout the whole space for audience under the practical using condition in a theater.

Figure 7:
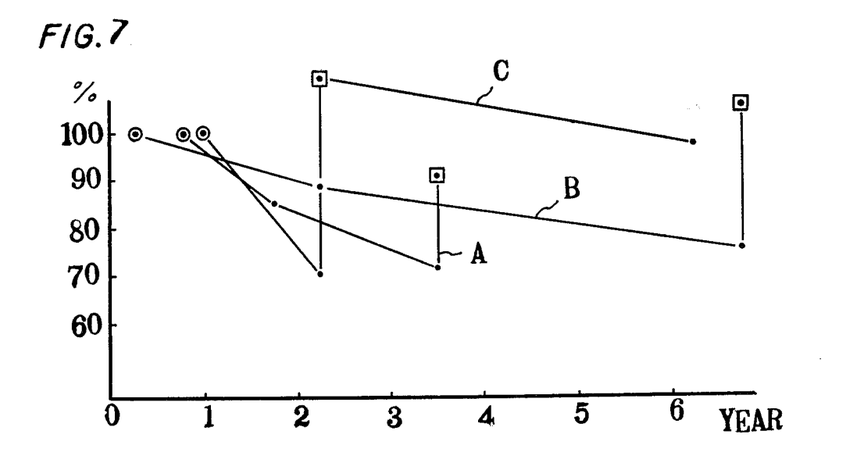

In FIG. 7, designations A and B relate both to white screens while C relates to silver screens. Designations ⊙ · and □ indicate the values measured at the time of the screen being newly set-up, at the middle time and at the time of re-painting respectively in this order.

As apparent from FIG. 7, the screens of prior art require repainting for supplementing reduced reflectability of the reflection surface within 1 or at least 2 years.

Such a measurement requires a long time of 2 – 3 years, so that data relating to a screen according to the present invention cannot be provided at present. However, from the fact that the reflection surface of screens of prior art are coated with a variety of paints and the degeneration of such coating layer causes the reduction of reflectability, it will be ensured that in a screen according to the present invention which can dispense with such special coating layer, yearly change of reflectability of the reflection surface is little. Further, it is an advantage of a screen according to the present invention that dust and the like attached to the screen can be washed away with water.

What is claimed is:

1. A screen comprising a woven transparent fabric layer made of clear glass yarn with a transparency more than 90 percent and having a front exposed surface of uniformly and minutely rough textile weave, and a layer of highly reflecting aluminum joined to said transparent fabric layer at a rear surface thereof, said transparent fabric layer having an optically dense structure for providing a highly diffused reflection of light beam projected thereto in combination with said layer of highly reflecting aluminum.

2. The screen of claim 1 wherein said transparent fabric layer has a fabric density of 40–150 pieces each of warp and weft per 25 mm, said numbers of weft and warp being substantially equal to each other.

3. The screen of claim 2 wherein each of said weft and warp is a twisted glass yarn comprising 100–200 pieces of glass filaments with the diameter of 3–13$\mu$.

4. The screen of claim 1 wherein said transparent fabric layer has a thickness of about 0.2 mm while said layer of highly reflecting aluminum is an aluminum foil with a thickness of about 0.01 – 0.1 mm.

* * * * *